United States Patent
Kenney et al.

(10) Patent No.: US 7,359,445 B2
(45) Date of Patent: *Apr. 15, 2008

(54) SYSTEM, METHOD AND COMPUTER PROGRAM PRODUCT FOR DEMODULATING QUADRATURE AMPLITUDE MODULATED SIGNALS BASED UPON A SPEED OF A RECEIVER

(75) Inventors: Thomas J. Kenney, San Diego, CA (US); Jean-Marie Tran, San Diego, CA (US); Gillyoung Jung, Escondido, CA (US)

(73) Assignee: Nokia Corporation, Espoo (FI)

( * ) Notice: Subject to any disclaimer, the term of this patent is extended or adjusted under 35 U.S.C. 154(b) by 718 days.

This patent is subject to a terminal disclaimer.

(21) Appl. No.: 10/608,345

(22) Filed: Jun. 27, 2003

(65) Prior Publication Data

US 2004/0264589 A1 Dec. 30, 2004

(51) Int. Cl.
*H04L 23/02* (2006.01)
(52) U.S. Cl. ...................................... 375/261
(58) Field of Classification Search ................ 375/261, 375/264, 298, 323, 340; 329/304; 370/206
See application file for complete search history.

(56) References Cited

U.S. PATENT DOCUMENTS

| 5,446,771 A | 8/1995 | Lin |
| 5,537,443 A * | 7/1996 | Yoshino et al. ............. 375/340 |
| 6,430,214 B1 * | 8/2002 | Jalloul et al. ............... 375/147 |
| 6,608,868 B1 * | 8/2003 | Murakami et al. .......... 375/261 |
| 2002/0044593 A1 | 4/2002 | Kuo |
| 2003/0072253 A1 * | 4/2003 | Hiramatsu .................. 370/206 |

FOREIGN PATENT DOCUMENTS

EP 1 191 713 A 3/2002

OTHER PUBLICATIONS

Liangchi Hsu, Mark W. Cheng, Ilkka Niva; *Evolultion Towards Simultaneous High-Speed Packet Data and Voice Services: An Overview of edma2000 1xEV-DV*; Proceedings of the Intenational Conference on Telecommunications; Feb. 23, 2003; pp. 1313-1317; vol. 2; XP010637987.

* cited by examiner

*Primary Examiner*—Don N. Vo
(74) *Attorney, Agent, or Firm*—Alston & Bird LLP

(57) ABSTRACT

A system, method and computer program product are provided for demodulating Quadrature Amplitude Modulated (QAM) signals based upon a speed of a receiver. The system includes a receiver and a demapping element. The receiver is capable of receiving a QAM signal over at least one slot. The demapping element can then be capable of estimating the amplitude of a signal constellation of the QAM signal over either one or more of the slot(s) or fractions of the slot(s) based upon the speed of the receiver. More particularly, the demapping element can estimate the amplitude by first estimating an expectation of a power of a signal combination of a traffic symbol and a pilot symbol, where the expectation can be estimated over either one or more of the slot(s) or fractions of the slot(s). The demapping element can also estimate a bias, and thereafter estimate the amplitude based upon the expectation of the power of the signal combination and the bias.

18 Claims, 4 Drawing Sheets

SYSTEM, METHOD AND COMPUTER PROGRAM PRODUCT FOR DEMODULATING QUADRATURE AMPLITUDE MODULATED SIGNALS BASED UPON A SPEED OF A RECEIVER

FIELD OF THE INVENTION

The present invention generally relates to systems and methods of processing Quadrature Amplitude Modulated (QAM) signals and, more particularly, relates to systems and methods for demodulating QAM signals based upon a speed of a receiver receiving the signals.

BACKGROUND OF THE INVENTION

A communication system is formed, at a minimum, of a base station and a mobile station, which are interconnected by way of a communication channel. Information to be communicated by the base station (also referred to as cell site) to the mobile station is transmitted via the communication channel to the mobile station. A wide variety of different types of communication systems have been developed and are regularly utilized to effectuate communication of information between base stations and mobile stations.

A wireless communication system is an example of a communication system that has been made possible due to advancements in communication technologies. Various standards have been promulgated relating to various types of wireless communication systems, and various types of wireless, as well as other, communication systems have been constructed, corresponding to such standards. The IS-95 and IS-2000 interim standards, promulgated by the EIA/TIA, are exemplary of standards which pertain to a wireless communication system, utilizing code division multiple access (CDMA) communication techniques.

Enhanced 3rd Generation CDMA systems are currently being developed to address high speed Internet packet data services. Examples of such systems, which are the result of an evolution of IS-95 and IS2000, are 1XEV-DO (TIA/EIA/IS-856) and 1XEV-DV standards. These systems utilize both CDMA and some type of time division multiplexing communication techniques.

In an effort to port the Internet to the wireless communication system, 1XEV-DV and 1XEV-DO systems use a fat data pipe concept, which is shared among a number of users (mobile stations). The fat pipe, called the shared supplemental channel, is de-multiplexed into several code channels according to the usual CDMA access techniques. In the current proposal for 1XEV-DV, for example, the pipe is actually transmitted on up to twenty-eight Walsh codes of length thirty-two. And in the current proposal for 1XEV-DO, the pipe is actually transmitted on sixteen Walsh codes of length sixteen, all of which are used to carry a Packet Data Channel (PDCH).

In contrast to other communication systems, 1XEV-DV and 1XEV-DO systems both include a Packet Data Channel (PDCH) on the forward link between the base station and the mobile station. This channel has attributes that are drastically different than previous channels in IS-2000. One of the most notable attributes, from a physical layer perspective, is the adoption of high-order modulation (HOM). In this regard, 1XEV-DV and 1XEV-DO defines a modulation technique known as 16-QAM (Quadrature Amplitude Modulation). As will be appreciated by those skilled in the art, to demodulate this modulation format, knowledge of the QAM signal constellation amplitude/size is required. Current techniques for determining the constellation amplitude/size, however, can be undesirably complex, while requiring an undesirable amount of computing resources and not producing optimal performance in practical channel conditions.

SUMMARY OF THE INVENTION

In light of the foregoing background, embodiments of the present invention provide an improved system, method and computer program product for estimating an amplitude of a signal constellation of a Quadrature Amplitude Modulated (QAM) signal such that the QAM signal can subsequently be demodulated based upon the amplitude estimation. Embodiments of the present invention are capable of estimating the constellation amplitude over one or more slots or over fractions of one or more slots depending upon the speed of the receiver. By estimating the constellation amplitude over an estimation interval that may include multiple slots or fractions of a slot, embodiments of the present invention are capable of estimating the amplitude with increased precision and decreased variance due to movement of the receiver. Embodiments of the present invention are also capable of estimating the amplitude of the signal constellation independent of the chip energy for user traffic on the supplemental channel, and chip energy for the pilot channel. As such, embodiments of the present invention are capable of estimating the constellation amplitude based upon values known, or capable of being estimated, by the system, which may be implemented in the receiver of a mobile station.

According to one aspect of the present invention a system is provided that includes a receiver and a demapping element, and may also include a master controller. The receiver is capable of receiving a QAM signal over at least one slot. The demapping element can then be capable of estimating the amplitude of a signal constellation of the QAM signal over either one or more of the slot(s) or fractions of the slot(s) based upon the speed of the receiver. More particularly, the demapping element can estimate the amplitude by first estimating an expectation of a power of a signal combination of a traffic symbol and a pilot symbol, such as by estimating the expectation based upon a number of symbols in the estimate and a number of active Walsh channels in the QAM signal.

For example, the demapping element can estimate the expectation by determining the power of a signal combination of a traffic symbol and a pilot symbol for each symbol in the estimate for each active Walsh channel. Then, the demapping element can sum the powers for the symbols for each active Walsh channel into a total power for each active Walsh channel, and thereafter sum the total powers for the active Walsh channels into. Next, the demapping element can average the aggregate power over the active Walsh channels to thereby estimate the expectation. Advantageously, the expectation can be estimated over either one or more of the slot(s) or fractions of the slot(s). In this regard, the demapping element can be capable of determining the power, summing the powers, summing the total powers, and averaging the aggregate power over either one or more of the slot(s) or fractions of the slot(s).

In addition to estimating the expectation, the demapping element can also estimate a bias based upon an energy of a difference between two consecutive pilot symbols and an energy of the pilot symbol, where the bias is estimated over the slot(s). The demapping element can then be capable of estimating the amplitude based upon the expectation of the power of the signal combination and the bias. According to this aspect, the system can also include a master controller capable of demodulating the traffic of the user in the supplemental channel of the QAM signal based upon the estimate of the amplitude.

A method and computer program product for estimating an amplitude of a signal constellation of a QAM signal such that the QAM signal can subsequently be demodulated based upon the amplitude estimation are also provided. Therefore, embodiments of the present invention are capable of estimating the amplitude of the signal constellation based upon a power of a signal combination of a traffic symbol and a pilot symbol. In this regard, the amplitude can be estimated independent of the chip energy for user traffic on the supplemental channel, and chip energy for the pilot channel. Embodiments of the present invention are also capable of estimating the constellation amplitude over one or more slots or over fractions of one or more slots depending upon the speed of the receiver to thereby estimate the amplitude with increased precision and decreased variance due to movement of the receiver. Embodiments of the present invention can thus estimate the amplitude of the signal constellation in a less complex manner, while requiring less computing resources and producing more optimal performance in practical channel conditions, when compared to conventional techniques. Therefore, the system and method of embodiments of the present invention solve the problems identified by prior techniques and provide additional advantages.

BRIEF DESCRIPTION OF THE DRAWINGS

Figure 1:
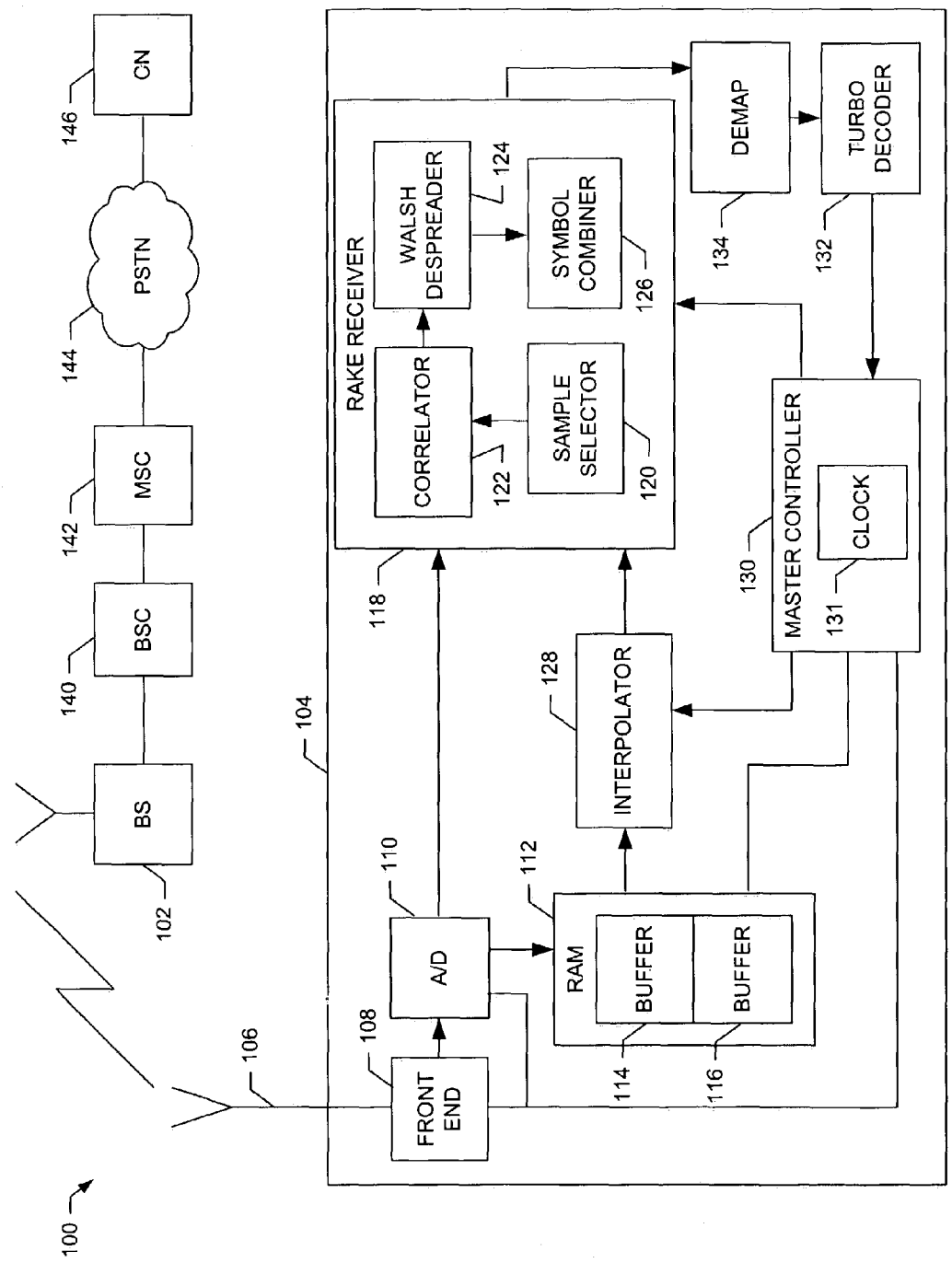
Figure 2:
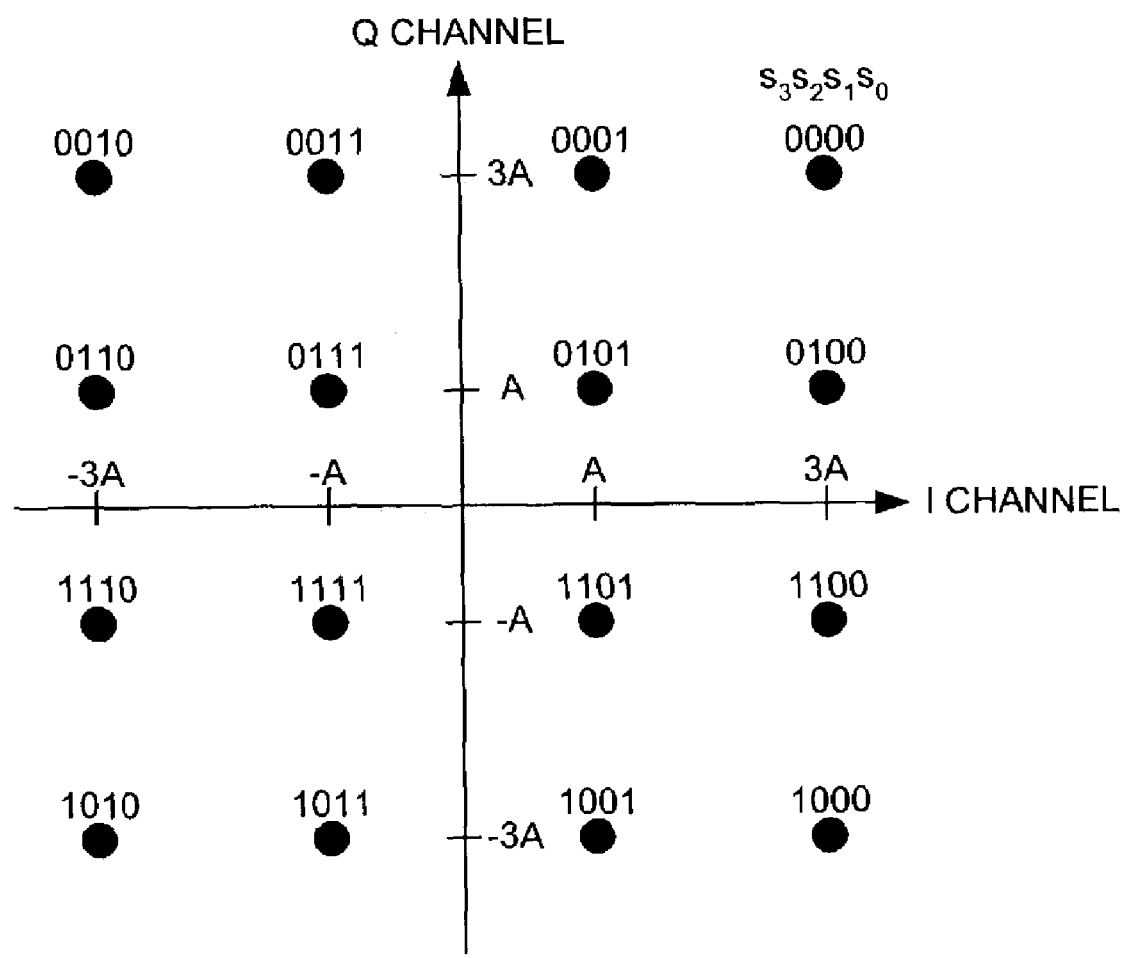
Figure 3:
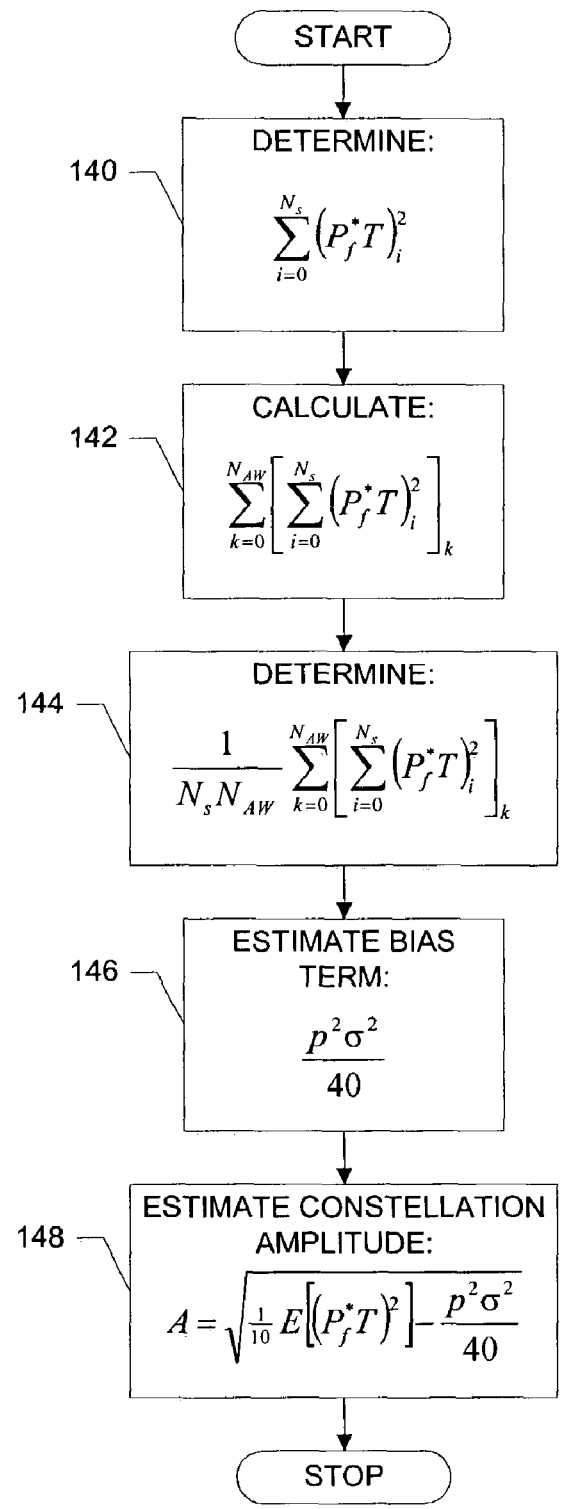
Figure 4:
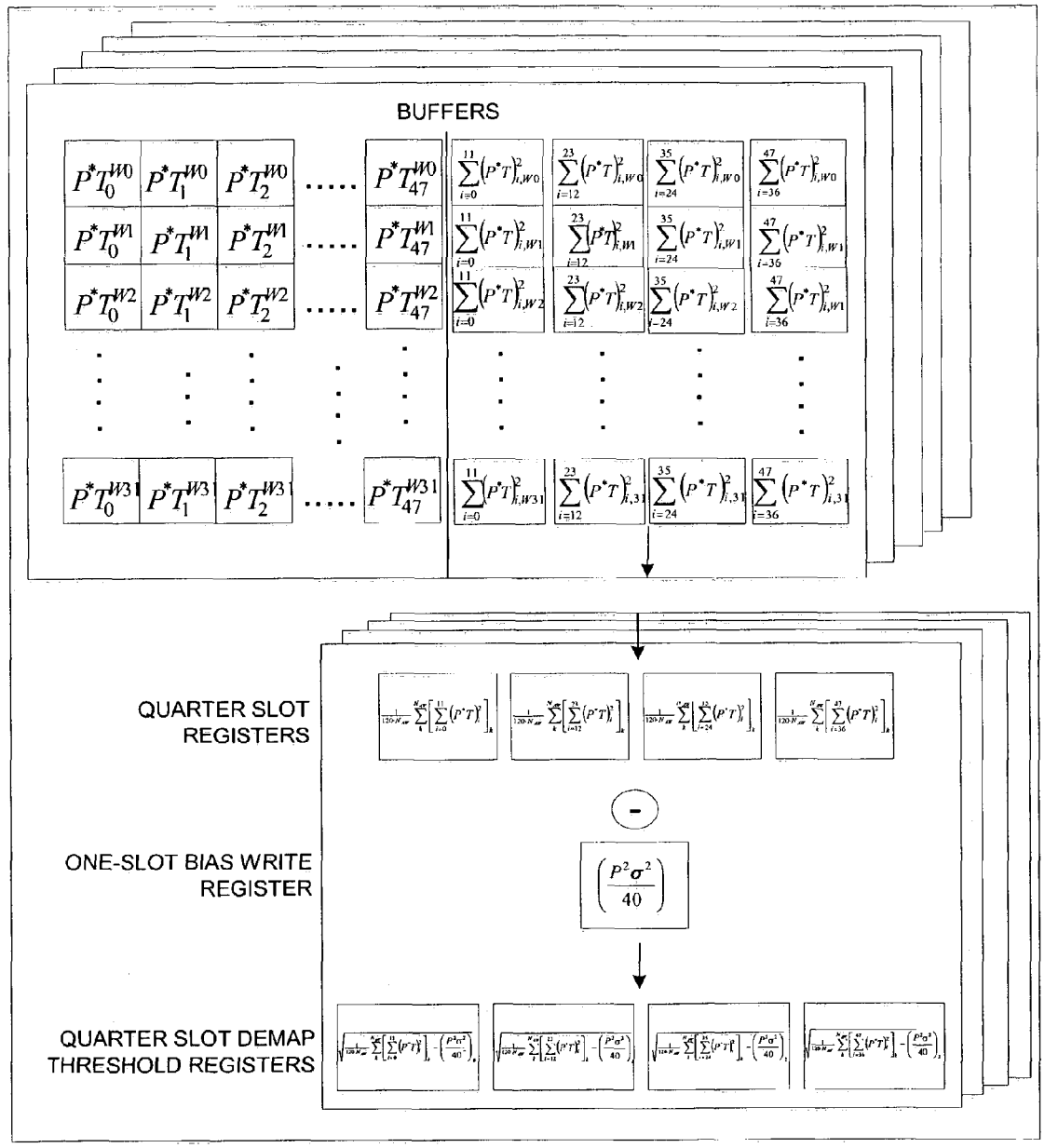

Having thus described the invention in general terms, reference will now be made to the accompanying drawings, which are not necessarily drawn to scale, and wherein:

FIG. 1 illustrates a schematic block diagram of an exemplary receiver used in a wireless communication system, according to one embodiment of the present invention;

FIG. 2 illustrates a signal constellation utilized in 16-QAM;

FIG. 3 illustrates various steps in a method of demodulating a QAM signal according to one embodiment of the present invention; and FIG. 4 illustrates a schematic diagram of the registers of a demapping element, according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of wireless communications system 100 including a terminal, such as a mobile station 104, that would benefit from the present invention is provided. It should be understood, however, that the mobile telephone illustrated and hereinafter described is merely illustrative of one type of mobile station that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers and other types of voice and text communications systems, can readily employ the present invention. In addition, while several embodiments of the system and method of the present invention include a terminal comprising a mobile station, the terminal need not comprise a mobile station. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The communication system 100 provides for radio communication between two communication stations, such as a base station (BS) 102 and the mobile station 104, by way of radio links formed therebetween. The mobile station is configured to receive and transmit signals to communicate with a plurality of base stations, including the illustrated base station. In the illustrated, exemplary embodiment, the communication system operates according to the specification proposed for 1XEV-DV (current proposal # C05-20010611-007 MNTIPA__1 XEV-DV L1 Framework) communication systems, which utilizes CDMA communication, and Quadrature Amplitude Modulation (QAM) techniques. It should be understood that operation of the embodiment of the present invention is similarly also possible in other types of radio, and other, communication systems. Therefore, while the following description shall describe operation of an embodiment of the present invention with respect to the 1XEV-DV systems, operation of an embodiment of the present invention can analogously be described with respect to any of various other types of communication systems, including and 1XEV-DO systems.

The base station 102, is coupled to a base station controller (BSC) 140. And the base station controller is, in turn, coupled to a mobile switching center (MSC) 142. The MSC is coupled to a network backbone, here a PSTN (public switched telephonic network) 144, and correspondent node (CN) 146 is coupled to the PSTN 144. A communication path is formable between the correspondent node 146 and the mobile station 104 by way of the PSTN, the MSC, the BSC and base station, and a radio link formed between the base station and the mobile station. Thereby, the communications, of both voice data and non-voice data, are effectual between the CN and the mobile station. In the illustrated, exemplary implementation, the base station defines a cell, and numerous cell sites are positioned at spaced-apart locations throughout a geographical area to define a plurality of cells within any of which the mobile station is capable of radio communication with an associated base station in communication therewith.

In the operation of the communication system 100 according to 1XEV-DV systems, the base station 102 transmits spread spectrum, QAM signals to the mobile station 104 on what is generally known as the forward link. In general, the forward link transmission comprises a plurality of frames defined by the proposed system specification. In the exemplary communication system, the signals are received substantially during reception of a frame on plurality of channels (forward link channels), generally comprising signals for a pilot channel, control channels, supplemental channels and dedicated channels. The supplemental channels comprise interleaved and spread data signals. The dedicated channel comprise signaling information about the data transmitted on the supplemental channels.

The base station 102 broadcasts on the forward link channels, for example, on a pilot channel, a paging channel, a control channel, a dedicated channel and a plurality of supplemental channels. Generally, all the supplemental channels are spread using a Walsh Code in a process known as Walsh covering. Additionally, all the channels are modulated using a modulation-coding scheme (MCS) having a modulation type and coding rate. The modulation schemes are defined by the type of system, such as 1XEV-DV, wherein each mobile station, in communication with one or more base stations, provides information, such as Carrier to Interference ratios (C/I) or Signal to Noise Ratio (SNR), to assist base stations in determining modulation type and coding rate.

In the exemplary communication system, the supplemental channels are shared among a plurality of mobile stations, including mobile station 104. The base station 102 operates according to an admission control algorithm to thereby determine when to transmit data packets to a particular mobile station, what modulation type and coding rate is used, which Walsh codes will be assigned to the mobile station, and which base station of the system will transmit the data packets. In the exemplary communication system according to 1XEV-DV, the supplemental channels typically comprise up to twenty-eight channels (Walsh channels), where any one of the channels may contain a packet of data for a particular mobile station. Each of the Walsh channels is spread using a different Walsh covering.

In the exemplary communication system, the base station 102 simultaneously transmits a packet of data and signaling information. The signaling information indicates to the mobile station 104 that the packet of data is sent to the mobile station. The signaling information may also determine the processing of supplemental channels, where the signaling information may comprise the modulation type and the code rate, the Walsh codes that are utilized, and the base station transmitting on the supplemental channels.

The mobile station 104, operable in 1XEV-DV systems, comprises an antenna 106, a front end filter 108, an analog to digital (A/D) converter 110, a Random Access Memory (RAM) 112, a rake receiver 118, an interpolator 128, a master controller 130, a demapping element 134 and a decoder 132. The antenna receives radio frequency (RF) signals (forward link) from the base station 102 and from other base stations in the vicinity. The received RF signals are converted to electrical signals by the antenna and provided to the front end. The front end filters the signals and provides conversion to baseband signals. The baseband signals are provided to the A/D converter, which converts the baseband signals to digital signals for further processing. Although not shown, the mobile station may also include an automatic gain controller (AGC), which may be separate from, or integral with, the front end filter.

In accordance with the an embodiment of the invention, the received signal (also referred to as current frame signal) is stored in Random Access Memory (RAM) 112. The received signal can be stored before or after despreading of the signal, but in one advantageous embodiment, the signal is stored prior to any despreading of the signal. More particularly, the RAM can, but need not, include first and second buffers 114 and 116. In this regard, the first buffer may therefore be used to store a current frame signal, and the second buffer may be used to store a previous frame signal. The master controller 130, coupled to the RAM, can then include logic to toggle the use between first buffer and second buffer. Because the signal is stored before despreading the signal, the memory size requirement is significantly less then if the signal was stored after despreading the signal. For more information on such a technique, see U.S. patent application Ser. No. 09/896,153, entitled: Method and Apparatus for Processing a Signal Received in a High Data Rate Communication System, filed Jun. 29, 2001, and published on Jan. 2, 2003 as U.S. Patent Application Publication No. 2003/0002453, the contents of which are hereby incorporated by reference in its entirety.

The rake receiver 118 can include a sample selector 120, a correlator 122, a Walsh despreader 124 and a symbol combiner 126. The rake receiver can process the signal received on the dedicated channel to determine signaling information, and thereafter send the signaling information to the master controller 130. Using well-known techniques, the rake receiver can extract the information necessary for the master controller to efficiently evaluate the supplemental channel data. The signaling information generally comprises an indication that packet data for a particular mobile station is on the supplemental channel. The signaling information further comprises the Walsh codes, number of the supplemental channel, the modulation type and the coding rate used by the base station 102. The signaling information may also comprise a system time counter, pseudo-random noise states and Long code states.

In accordance with embodiments of the present invention, the signaling information may further comprise the amplitude of the QAM signal constellation when the modulation type is QAM. In this regard, the demapping element (Demap) 134 is capable of determining, or estimating, the amplitude of the signal constellation. In this regard, the demapping element can comprise any of a number of different elements capable of processing portions of the received signal to thereby determine, or estimate, the amplitude of the signal constellation. For example, the demapping element may comprise a processor such as a digital signal processor (DSP), an application specific integrated circuit (ASIC), or the like.

The master controller 130 can include a clock 131, and comprise logic to control the operations of all the components of the receiver. The clock controls timing of the mobile station 104. The master controller is coupled to the other elements of the mobile station and such interconnections are not shown so as to not unduly complicate the drawing figure.

In an operation of an embodiment of the present invention, for every frame, the rake receiver 118 of the receiver 104 can process the dedicated channel of the received signal to thereby determine the signaling information for the current frame. Thereafter, the rake receiver can send the signaling information to the master controller 130 via the decoder 132. Simultaneously, the signal, which contains all channels, including the supplemental channels, can be stored in the RAM 112. In embodiments where the RAM includes first and second buffers 114, 116, the master controller may determine which one of the buffers to use. Generally, one buffer is used to store current frame signal and the other buffer is used to store previous frame data. Simultaneously, the master controller having soft information from the previous frame, replays the previous frame data stored in the RAM to process the data using the soft information. The master controller only replays the stored data, if the soft information indicates that a packet data for mobile station is in the signal received on the supplemental channel. The master controller determines which buffer to use for storing the current frame signal.

The master controller 130 comprises logic capable of decoding the signaling information comprising the modulation type, coding rate, the Walsh codes assigned to the mobile station 104 and the base station 102 that transmitted the data. Using the Walsh code assignment extracted from the soft information, the master controller can process the control channel, and thereafter despread the supplemental channels to extract the data packets as defined in the 1XEV-DV specification. More particularly, the master controller is capable of processing the received signal using the signaling information received from the rake receiver 118. Using the signaling information, then, the master controller can determine if there is a data packet for this mobile station on any of the shared supplemental channels. If yes, the master controller can despread the received signal using the signaling information, such as the Walsh codes and other information. Thereafter, the master controller can process the control channel and the supplemental channel, and decode the data using the signaling information.

The master controller can also comprise logic to control the operation of the interpolator 128 for generating the best sampling instant for the correlator 122. The master controller uses the signaling information from the rake receiver 118 to program the interpolator. In this regard, the interpolator may be a single hardware unit, used in a time divisional method (i.e., time shared). The interpolator, according to one embodiment of the present invention, is controlled by a master controller 130. In operation, then, the master controller can control the interpolator to thereby generate best sampling instances.

As indicated in the background section, to demodulate 16-QAM signals in accordance with 1XEV-DV communication systems, knowledge of the signal constellation amplitude is required. Therefore, according to embodiments of the present invention, the master controller 130 is capable of estimating the constellation amplitude, referred to herein as parameter A. Although embodiments of the present invention are described in conjunction with 1XEV-DV systems, embodiments of the present invention are equally applicable to any of a number of different systems and methods of demodulating 16-QAM signals, and more generally to any of a number of different systems and methods of demodulating M-ary QAM signals, including 1XEV-DO systems. Advantageously, embodiments of the present invention are capable of estimating the parameter A in accordance with a technique that requires less computing resources and produces optimal performance, when compared to conventional techniques.

As background, the structure of the dedicated channel, often referred to as the packet data channel (PDCH) in 1XEV-DV communication systems, and more specifically the details of mapping for 16-QAM, are described below. More particularly, the details provided are as such is described in 3GPP2 C.S0002-C, version 1.0, entitled: *Physical Layer Standard for cdma2000 Spread Spectrum Systems—Release C*, the contents of which are hereby incorporated by reference in its entirety. As indicated above, it should be understood that although embodiments of the present invention are described herein with respect to 1XEV-DV systems, embodiments of the present invention are equally applicable to other systems, such as 1XEV-DO systems. As well known to those skilled in the art, for 16-QAM, four symbols ($S_0$, $S_1$, $S_2$, $S_3$) out of a subpacket symbol selection operation are grouped to form a single 16-QAM modulation symbol. The selection can be expressed in any one of a number of different manners, but as described in 3GPP2 C.S0002-C, the selection can be expressed as: $s_0=x(2L+2i)$, $S_1=x(2i)$, $s_2=x(2L+2i+1)$, $s_3=x(2i+1)$. In the preceding, L repre of 16-QAM modulation symbols in all the Walsh channels of the PDCH subpacket. Therefore, with 16-QAM, there are a total of 4×L encoded symbols that makeup the L modulation symbols. These four encoded symbols can then be mapped into the following complex modulation symbols $\{m_1(i)+jm_Q(1)\}$, where $i=0, \ldots, L-1$; and $k=0, 1, 2, 3$. For an illustration of the signal constellation for 16-QAM, see FIG. 2.

As shown in FIG. 2, parameter A is assigned such that $A=1/\sqrt{10}$ to thereby provide unit total power from the QAM modulator, as such may be included within the base station 102. In this regard, total power can be determined as follows:

$$P = \frac{1}{N} \sum_{n=0}^{15} [m_I^2(n) + m_Q^2(n)] \quad (1)$$

$$P = \frac{1}{16}[4(A^2 + A^2) + 8\{(3A)^2 + A^2\} + 4\{(3A)^2 + (3A)^2\}] = \frac{160A^2}{16} = 10A^2$$

where n is an integer represented by forming a binary number from the symbols $s_0s_1s_2s_3$, and thereafter converting the binary number to a decimal. As can be shown by combining the value of A with the total power given in equation (1), the total base station power equals one.

As also well known to those skilled in the art, 16-QAM is a multilevel modulation scheme, and as such, three different modulation symbol power levels exist, i.e., A, 2A and 3A. Therefore, a bias can exist if the points on the constellation (see FIG. 2) are not equiprobable. This problem can be avoided, however, by utilizing a scrambler to insure that symbols are equiprobable. Clearly, then, an estimation of the constellation power is dependent on this random sampling in addition to the number of modulation symbols.

As will be appreciated by those skilled in the art, to demodulate 16-QAM signals, knowledge of the constellation amplitude is required, where the constellation amplitude can be represented by the parameter A. Thus, according to embodiments of the present invention, the mobile station 104, or more particularly the demapping element 134 of the mobile station, is capable of estimating the amplitude of the constellation (i.e., parameter A). The following will describe operation of the mobile station in estimating parameter A for a one-path AWGN (Additive White Gaussian Noise) channel. It should be understood, however, that the mobile station is capable of estimating parameter A for any of a number of different types of channels, without departing from the spirit and scope of the present invention.

Assuming perfect phase and an AWGN channel, the receiver of the mobile station 104 can receive a QAM signal r, which can be represented as follows:

$$r = \left\{ \left( \sqrt{\frac{E_{ct}}{2}} Q_t^{re} W_t + \sqrt{\frac{E_{co}}{2}} Q_o^{rel} W_o + \sqrt{\frac{E_{cp}}{2}} W_p \right) c_{re} - \left( \sqrt{\frac{E_{ct}}{2}} Q_t^{im} W_t + \sqrt{\frac{E_{co}}{2}} Q_o^{im} W_o \right) c_{re} + n_{re} \right\} + \quad (2)$$

-continued $$j\left\{\left(\sqrt{\frac{E_{ct}}{2}}\,Q_t^{re}W_t + \sqrt{\frac{E_{co}}{2}}\,Q_o^{re}W_o + \sqrt{\frac{E_{cp}}{2}}\,W_p\right)c_{im} + \right.$$

$$\left.\left(\sqrt{\frac{E_{ct}}{2}}\,Q_t^{im}W_t + \sqrt{\frac{E_{co}}{2}}\,Q_o^{im}W_o\right)c_{im} + n_{im}\right\}$$

In equation (2), $(n_{re}, n_{im}) = N(0, \sqrt{I_{oc}/2})$ represent the real and imaginary noise terms with $I_{oc}$ representing the power spectral density of a band-limited white noise source (modeling interference from other cells, as measured at the mobile station antenna connector (not shown); $E_{ct}$, $E_{co}$, and $E_{cp}$ represent the chip energy for user traffic on the supplemental channel, other users' traffic on the supplemental channel, and the pilot channel, respectively; and $W_t$, $W_o$, and $W_p$ represent the Walsh functions for the desired user traffic, other users traffic and pilot channel, respectively. Also, in equation (2), $c_{re}, c_{im} \in (1,-1)$ represent the real and imaginary terms of a pseudo-noise (PN) sequence. Further, $Q_t^I$, $Q_t^Q$ and $Q_o^I$, $Q_o^Q$ represent the transmitted complex modulation symbols, which can be QPSK, 8-PSK or 16-QAM in 1XEV-DV communication systems, for the desired user traffic and other user traffic, respectively.

For clarity, traffic from only one other user on the supplemental channel is considered, where the total transmitted signal power at the transmitter antenna (e.g., at the base station 102) is equal to one ($I_{or}=1$). It should be understood, however, that traffic from more than one other user can be considered, and the total transmitted signal power need not equal one. Also, while the representation of the received signal only considers one Walsh channel, the mobile station can receive signals, and estimate the parameter A for, any number of Walsh channels, without departing from the spirit and scope of the present invention.

After reception, the signal is scaled by the AGC (not shown), and sampled by the A/D converter 110, where the output of the A/D converter can be given as:

$$r_d = k_{AGC} \times G_{A/D} \times r = k \times r \qquad (3)$$

In equation (3), $k_{AGC}$ represents the AGC scaling, $G_{A/D}$ represents the gain of the A/D, and k represents the product of the AGC scaling and the gain of the A/D. In each finger, the signal can then be despread by the Walsh despreader 124 using the complex conjugate of the transmitted PN sequence to obtain:

$$r_d = k\left\{\begin{array}{l}\sqrt{2E_{ct}}\,Q_t^{re}W_t + \sqrt{2E_{co}}\,Q_o^{re}W_o + \sqrt{2E_{cp}}\,W_p + n'_{re} + \\ j(\sqrt{2E_{ct}}\,Q_t^{im}W_t + \sqrt{2E_{co}}\,Q_o^{im}W_o + n'_{im})\end{array}\right\} \qquad (4)$$

In equation (4), $n_{re}{}^t = n_{re}c_{re} + n_{im}c_{im}$ and $n_{im}{}^t = n_{im}c_{re} - n_{re}c_{im}$. And as $c_{re}, c_{im} \in (1, -1)$, from before, it can be shown that $(n_{re}{}^t, n_{im}{}^t) = N(0, \sqrt{I_{oc}})$. After being despread, the signal can b multiplied by the corresponding Walsh function and accumulated by the symbol combiner 126 to form the traffic and pilot symbols. In this regard, the pilot symbol can be expressed as follows:

$$P = kN_p\sqrt{2E_{cp}} + n_{P_{re}} + jn_{P_{im}},\ (n_{P_{re}},\ n_{P_{im}}) = N(O,\ \sqrt{k^2 N_p I_{oc}}) \qquad (5)$$

where $N_p$ represents the pilot symbol correlation length. Similarly, the traffic symbol can be represented as follows:

$$T = kN_t\sqrt{2E_{ct}}Q_t^{re} + n_{t_l} + j\{kN_t\sqrt{2E_{ct}}Q_t^{im} + n_{t_Q}\},\ (n_{t_l}\ n_{t_Q}) = \\ N(O,\ \sqrt{k^2 N_t I_{oc}}) \qquad (6)$$

After forming the pilot symbol, the pilot symbol can be filtered by a unit gain infinite impulse response (IIR) filter (not shown) with an equivalent noise reduction factor of $N_{rf}$, where the IIR filter may be integral with, or distributed from, the symbol combiner. The filtered pilot symbol can then be represented as follows:

$$P_f = kN_p\sqrt{2E_{cp}} + n_{P_{re}} + jn_{P_{im}},\ (n_{P_{re}}, n_{P_{im}}) = \\ N(0, \sqrt{k^2(N_{9p}/N_{rf})I_{oc}})$$

Considering a one-path AWGN, the output of the symbol combiner 126 can be represented as:

$$P_f^* T = 2k^2 N_p N_t \sqrt{E_{cp}E_{ct}}\,Q_t^{re} + n_{t_{re}}kN_p\sqrt{2E_{cp}} + \qquad (8)$$
$$n_{P_{re}}kN_t\sqrt{2E_{ct}}\,Q_t^{re} + n_{P_{re}}n_{t_{re}} + n_{P_{im}}kN_t\sqrt{2E_{ct}}\,Q_t^{im} +$$
$$n_{P_{im}}n_{t_{im}} + j\{2k^2 N_p N_t\sqrt{E_{cp}E_{ct}}\,Q_t^{im} + n_{t_{im}}kN_p\sqrt{2E_{cp}} +$$
$$n_{P_{re}}kN_t\sqrt{2E_{ct}}\,Q_t^{im} + n_{P_{re}}n_{t_{im}} + n_{P_{im}}kN_t\sqrt{2E_{ct}}\,Q_t^{re} + n_{P_{im}}n_{t_{re}}\}$$

To estimate the parameter A, interest is drawn to only the signal portion or, namely, the following:

$$\{P_f^* T\}_{signal} = 2k^2 N_t N_p \sqrt{E_{cp}E_{ct}} E[Q_t^{re} + jQ_t^{im}]$$

From before in equation (1), the signal constellation power can be represented as $P_Q = 10A^2$. To arrive at the optimal value for parameter A, then, the expectation of the signal power, or the average signal power, given by equation (9) can be combined with the constellation power from equation (1) as follows:

$$P_Q = 10A^2 = E\lfloor\{P_f^* T\}_{signal}^2\rfloor \qquad (10)$$
$$= 2k^2 N_t N_p \sqrt{E_{cp}E_{ct}}\,E[\{Q_t^{re} + jQ_t^{im}\}^2]$$
$$= 4k^4 N_t^2 N_p^2 E_{cp}E_{ct}$$

From before, the modulated symbol for 16-QAM at the transmitter (e.g., at the base station 102) has an average power of unity as demonstrated in equation (1). Thus, squaring equation (9) to attain the signal power, equating the squared term to equation (10) and solving for parameter A, gives:

$$A = \frac{2}{\sqrt{10}}k^2 N_t N_p \sqrt{E_{cp}E_{ct}} \qquad (11)$$

As will be appreciated by those skilled in the art, in the above equation (11), both the chip energy for the pilot channel, $E_{cp}$ and the chip energy for the user traffic on the supplemental channel, $E_{ct}$, are unknown quantities at the receiver and, therefore, typically must be estimated. A reliable estimate of $E_{cp}$ is typically not that difficult as the pilot signal is unmodulated. In contrast, a reliable estimate of $E_{ct}$ is typically more difficult to obtain. In examining the first terms of the real and imaginary parts of equation (8), it can be shown that the first terms are very similar to equation (11), with the exception of the data symbol. Thus, squaring equation (8) and taking the expectation to remove the noise terms gives:

$$E[(P_f^r T)^2] = \qquad (12)$$
$$4k^4 N_p^2 N_t^2 E_{cp} E_{ct} + 4k^4 N_p^2 N_t I_{oc} E_{cp} + 4k^4 N_p N_t^2 I_{oc} \frac{E_{ct}}{N_{rf}} + \frac{4k^4 N_t N_p}{N_{rf}} I_{oc}^2$$

As seen, the desired expression is attained in the first term of equation (12). However, equation (12) also includes bias terms. Considering that in one typical embodiment $N_p=64$, $N_t=32$, $N_{rf}\approx14.4$, and, at the extremes $E_{cp}\approx E_{ct}$, the first two terms dominate. Omitting the third and fourth terms in equation (12), then, results in the following expression:

$$E[(P_f^* T)^2] = 4k^4 N_p^2 N_t^2 E_{cp} E_{ct} + 4k^4 N_p^2 N_t I_{oc} E_{cp} \qquad (13)$$

To estimate the desired signal, the bias term (second term) can be subtracted from equation (13). To perform such a subtraction, however, the bias term must be taken into account. According to one advantageous embodiment, an estimate of the bias term can be obtained using the squared pilot symbol accompanied with an estimate of the noise variance. In this regard, as will be appreciated by those skilled in the art, the energy of the pilot symbol can be represented as follows:

$$p^2 = E\{(P_f^r P_f)\} = 2k^2 N_p^2 E_{cp} + 2k^2 \frac{N_p}{N_{rf}} I_{oc} \qquad (14)$$

Using the same reasoning as before (the first term dominates the second term), the second term in equation (14) can be ignored to provide:

$$p^2 = E\{(P_f^* P_f)\} = 2k^2 N_p^2 E_{cp} \qquad (15)$$

As can be shown, the variance of the signal can be estimated by calculating the energy of the difference between two consecutive pilot symbols as follows:

$$\sigma^2 = E\{(P(t) - P(t-1))^2\} \qquad (16)$$
$$= E\left\{\left[\begin{array}{c} kN_p\sqrt{2E_{cp}(t)} + n_{p_{re}}(t) + jn_{p_{im}}(t) - \\ (kN_p\sqrt{2E_{cp}(t-1)} + n_{p_{re}}(t-1) + jn_{p_{im}}(t-1)) \end{array}\right]^2\right\}$$
$$= E\left\{\left[\begin{array}{c} kN_p(\sqrt{2E_{cp}(t)} - \sqrt{2E_{cp}(t-1)}) + \\ n_{p_{re}}(t) - n_{p_{re}}(t-1) + j(n_{p_{im}}(t) - n_{p_{im}}(t-1)) \end{array}\right]^2\right\}$$

Now, assuming the dedicated channel is constant during two pilot symbol periods, the first term in equation (16) vanishes to thereby yield:

$$\sigma^2 = \qquad (17)$$
$$E\{n_{p_{re}}^2(t)\} + E\{n_{p_{im}}^2(t)\} + E\{n_{p_{re}}^2(t-1)\} + E\{n_{p_{im}}^2(t-1)\} = 4k^2 N_p I_{oc}$$

The bias term can then be estimated by first combining the expression for the energy of the difference between two consecutive pilot symbols given in equation (17) and the energy of the pilot symbol given in equation (15):

$$p^2 \sigma^2 = 8k^4 N_p^3 E_{cp} I_{oc} \qquad (18)$$

Equating the second term in equation (13) with equation (18) provides:

$$4k^2 N_p^2 N_t I_{oc} E_{cp} = \left(\frac{N_t}{2N_p}\right) p^2 \sigma^2 \qquad (19)$$

Thus, with the substitution of $N_p=2N_t$ (shown above for one typical embodiment), an estimate of the parameter A can be formulated as follows:

$$A = \sqrt{\frac{1}{10} E[(P_f^r T)^2] - \frac{p^2 \sigma^2}{40}} \qquad (20)$$

To further define the estimate of parameter A, it can be shown that the expectation can be estimated as:

$$E[(P_f^r T)^2] = \frac{1}{N_s N_{AW}} \sum_{k=0}^{N_{AW}} \left[\sum_{i=0}^{N_s} (P_f^r T)_i^2\right]_k \qquad (21)$$

where $N_s$ represents the number of symbols in the estimate, and $N_{AW}$ represents the number of active Walsh channels in the current transmission. If it is assumed that the estimation interval is over a quarter-slot interval, described further below, then $N_p=12$ and equation (21) can be rewritten as:

$$A = \sqrt{\frac{1}{120 N_{AW}} \sum_{k=0}^{N_{AW}} \left[\sum_{i=0}^{11} (P_f^r T)_i^2\right]_k - \frac{p^2 \sigma^2}{40}} \qquad (22)$$

Referring now to FIG. 3, a method of demodulating a QAM signal can include estimating the amplitude of the QAM signal constellation. In this regard, to estimate the amplitude of the signal constellation, the power $(P_f^* T)^2$ of the signal combination of the traffic symbol and the pilot symbol, or more particularly the filtered pilot symbol, can be determined. More particularly, the method of demodulating the QAM signal can include determining the power for each symbol (i=0, . . . , N,) in the estimate for each active Walsh channel (k=0, . . . , $N_{AW}$) The powers for the symbols for each active Walsh channel can then be summed to calculate a total power for each active Walsh channel, as shown in block 140. Then, the total powers for the active Walsh channels can be summed to determine an aggregate power, as shown in block 142. The aggregate power over the active Walsh channels can then be averaged by dividing the aggregate power by the product of the number of symbols (N,) in the estimate and the number of active Walsh channels ($N_{AW}$), as shown in block 144. As shown in equation (21), the average of the aggregate power over the active Walsh channels represents the expectation of the power $(P_f^* T)^2$ of the signal combination of the traffic symbol and the filtered pilot symbol.

Either before, after or as the expectation of the power of the signal combination of the traffic symbol and filtered pilot symbol is determined, a bias term can be determined based upon an energy of a difference between two consecutive pilot symbols and an energy of the pilot symbol. More particularly, the bias term can be determined based upon a product of a pilot symbol variance $\sigma^2$ and the energy of the pilot symbol $p^2$, as shown in block 146. After determining the bias term and the expectation of the power of the signal combination, the amplitude of the signal constellation (i.e., parameter A) can be estimated based upon the bias term and the expectation of the power of the signal combination. In this regard, as illustrated in block 148 and shown in equation (20), the amplitude of the signal constellation can be estimated based upon the difference of the expectation and the bias term.

As mentioned in previous sections, the estimation of the parameter A is dependent on system configuration and channel conditions. For illustrative purposes two configurations can be considered, one utilizing twenty-six Walsh channels with a one-slot transmission, and the other configuration using one Walsh channel but with a four-slot transmission. If it is assumed that the estimation of parameter A is accomplished over a one-slot interval, there are twenty-six times more complex symbols from which to estimate the power in the former compared to the latter. If it is known that the receiver of the mobile station 104 is not experiencing medium or fast fading, it would be advantageous to compute the power over all four slots for the latter case. This would therefore reduce the variance of the estimate. This extends to all multi-slot transmissions where it is known apriori that the channel is static, or nearly static, over the multi-slot interval. Therefore, it is desired to incorporate a mode which allows for estimation over 1, 2 or 4 slots, where a slot is generally defined as one PCG (Power Control Group).

In contrast, if it is known apriori that the receiver of the mobile station 104 is moving at a moderate to high speeds, then estimating the power over sub-intervals of the slot would likewise be advantageous. Therefore, the technique for estimating parameter A in one advantageous embodiment is flexible such that that the receiver can be configured on a slot-by-slot basis. Subdividing the estimation interval provides a means to combat fading and improve performance of the receiver. As described herein, the slot is subdivided into ¼ slot, but it should be understood that the slot can be subdivided into a smaller or larger fraction without departing from the spirit and scope of the present invention.

The estimation interval can be selected, such as by the master controller 130 or the rake receiver 118, based on the speed of the mobile station 104. More particularly, the estimation interval can be selected based upon one or more values representative of the speed of the mobile station, or more particularly representative of the speed of the receiver of the mobile station. For example, the master controller can select the estimation interval based upon the number of received symbols, the code rate, etc. The estimation interval can be selected based upon the speed of the mobile station, or more particularly based upon a representation of the speed of the receiver, in any one of a number of different manners. Generally, however, shorter estimation intervals are selected at higher speeds, with longer estimation intervals selected at slower speeds.

For multi-slot/sub-slot processing, an additional parameter (register), referred to as $M_{slot}$, can be introduced. Based on the setting of $M_{slot}$, the symbol powers can be summed over ¼, ½, 1, 2 or 4 slot intervals corresponding to $M_{slot}$=1, 2, 3, 4 or 5, respectively. Such an estimation interval typically applies the estimation of the received symbol power as given in equation (12), and estimated in equation (22). Because, the bias term estimate given in equation (18), and estimated in equations (15) and (17), is more sensitive to noise variance, however, the bias term can be estimated over longer intervals.

Based on the system 100 shown in FIG. 1, the power $(P^{/*}T)^2$ can be determined by the demapping element 134. Such power is typically comprised of all the symbols for each active Walsh channel. The demapping element can therefore pre-compute (prior to the decoder 132 decoding the PDCH subpacket) the power for each symbol of each Walsh channel. Once the PDCH subpacket has been demodulated, the demapping element can select the pre-computed power value for each active Walsh channel and sum those values to arrive at the total power.

To arrive at the estimate of parameter A, the bias term from equation (18) can be subtracted from the summed power, where the bias term can be computed as described above. Since such a technique is pilot-based, the bias term can be computed in the rake receiver 118, for example, for the active finger(s) carrying the PDCH subpacket. The demapping element 134 can then write these values prior to enabling PDCH demodulation. Once the rake receiver starts demodulation of the PDCH subpacket, the demapping element can compute the total power by summing the active Walsh channels and then subtracting the bias term provided by the rake receiver. After subtracting the bias term from the sum of the active Walsh channels, the demapping element can compute the square root of the final value to thereby estimate the parameter A.

For simplicity, the demapping element 134 can operate in an identical manner for all $M_{slot}$ configurations. Generally, the demapping element utilizes a first threshold register over the first ¼ of the slot, the 2nd threshold register over the following ¼ of the slot and so on. The demapping element typically operates consistently regardless of the value of $M_{slot}$ as outlined below. A schematic diagram of the demapping element registers and their contents for one slot are provided in FIG. 4, where the demapping element may include registers for one or more slots (e.g., one, two or four slots). In this regard, for the demapping element, additional registers may be required to support $M_{slot}$ functionality. Having a smallest sub-slot of ¼, for example, predicates that the demapping element includes an additional $32 \times M_{slot} \times 5 = 640$ memory locations for the received power values.

As shown, the registers may include five sets of buffers for the Walsh power calculations that are used in the pre-processor phase (i.e., prior to decoding the PDCH subpacket). Here the power may be computed for up to twenty-eight Walsh functions over a quarter-slot time and stored in to one of the five buffers. The five buffers are required to accommodate up to four-slot transmission plus the addition of the fifth buffer to allow post-processing while a new slot is being received. In addition to the five buffers, the registers include four buffers to form a demap threshold. In this regard, the four buffers can accommodate up to four-slot transmissions. It will be noted that, an extra buffer is not required here since these four buffers are utilized post-processing. Once the PDCH subpacket is demodulated, and the demapping element is programmed, the active Walsh functions are known and summed to arrive at a quarter-slot averaged power estimate. As shown, four quarter-slot registers are typically utilized for the four buffers.

More particularly, for $M_{slot}$=1 the demapping element 134 can compute and write each quarter-slot power value to each of the quarter-slot registers. For $M_{slot}$=2, the demapping element can compute the power over each quarter-slot for the entire slot and again write those results to each of the quarter-slot registers as in the $M_{slot}=1$ case. Then, the demapping element can sum (in a temporary register, where the bit-widths are allowed to grow) the first two quarter-slot power values and divide the result by two to attain the half-slot power. This half-slot power can then be written to both the first and second quarter-slot registers. Additionally, the third and fourth power values currently stored in the quarter-slot registers can be summed, with that result also being divided by two and thereafter written to the third and fourth quarter-slot registers. This same process can also be utilized for the remaining $M_{slot}$ values. For $M_{slot}=3$, then, the demapping element can compute the power over each quarter-slot for the entire slot and write those results to each of the quarter-slot registers. Next, all four quarter-slot power values can be summed and divided by four to attain the one-slot power. The result can then be copied into each of the four quarter-slot registers.

For $M_{slot}=4$, the demapping element 134 can compute the power over each quarter slot for two slots and write the powers to the four quarter-slot registers for each slot (eight values in total). Then, the demapping element can sum all eight quarter-slot values and divide by eight to attain the two-slot power. This single value can then be written to eight quarter-slot registers. For $M_{slot}=5$, the demapping element can compute the power over each quarter slot for four slots and write them to the four quarter-slot registers for each of the respective slots (sixteen values in total). Then, the demapping element can sum all sixteen quarter-slot power values and divide by sixteen to attain the four-slot power. This single value can then be written to all sixteen quarter-slot registers. The demapping element can sum either two or four of the bias values (in a temporary register), divide by two or four to obtain the two or four-slot averaged bias, and then write the single result to the two or four bias averaged registers for $M_{slot}=4$ or 5, respectively. The rake receiver 118, irrespective of the selected $M_{slot}$, can compute the bias on a slot-by-slot basis. The demapping element can also write to the bias register each computed one-slot value.

According to one aspect of the present invention, the system of the present invention, such as the demapping element 134 of the mobile station 104, generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 3 is a flowchart of a method, system and program product according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
receiving, from a receiver, a Quadrature Amplitude Modulated (QAM) signal, wherein the signal comprises a pilot channel and a supplemental channel that includes traffic of a user and at least one other user, and wherein the signal is received over at least one slot; and
estimating an amplitude of a signal constellation of the QAM signal over one of at least one of the at least one slot and fractions of the at least one slot based upon a speed of the receiver.

2. A method according to claim 1, wherein estimating an amplitude comprises:
estimating an expectation of a power of a signal combination of a traffic symbol and a pilot symbol, wherein the expectation is estimated over one of at least one of the at least one slot and fractions of the at least one slot;
estimating a bias based upon an energy of a difference between two consecutive pilot symbols and an energy of the current pilot symbol, wherein the bias is estimated over the at least one slot; and
estimating the amplitude based upon the expectation of the power of the signal combination and the bias.

3. A method according to claim 2, wherein estimating the expectation comprises estimating the expectation over one of at least one of the at least one slot and fractions of the at least one slot based upon a number of symbols in the estimate and a number of active Walsh channels in the QAM signal.

4. A method according to claim 3, wherein estimating the expectation comprises:
determining the power of a signal combination of a traffic symbol and a pilot symbol for each symbol in the estimate for each active Walsh channel;
summing the powers for the symbols for each active Walsh channel into a total power for each active Walsh channel;
summing the total powers for the active Walsh channels into an aggregate power; and averaging the aggregate power over the active Walsh channels wherein determining the power, summming the powers, summing the total powers and averaging the aggregate power occur over one of at least one of the at least one slot and fractions of the at least one slot.

5. A method according to claim 1, wherein estimating the amplitude comprises estimating the amplitude based upon a power of a signal combination of a traffic symbol and a pilot symbol.

6. A method according to claim 1 further comprising:
demodulating the traffic of the user in the supplemental channel of the QAM signal based upon the estimate of the amplitude.

7. A system comprising:
a receiver configured to receive a Quadrature Amplitude Modulated (QAM) signal, wherein the signal comprises a pilot channel and a supplemental channel that includes traffic of a user and at least one other user, and wherein the receiver is configured to receive the signal over at least one slot; and
a demapping element in electrical communication with the receiver, wherein the demapping element is configured to estimate an amplitude of a signal constellation of the QAM signal over one of at least one of the at least one slot and fractions of the at least one slot based upon a speed of the receiver.

8. A system according to claim 7, wherein the demapping element is configured to estimate an expectation of a power of a signal combination of a traffic symbol and a pilot symbol, the expectation being estimated over one of at least one of the at least one slot and fractions of the at least one slot, wherein the demapping element is also configured to estimate a bias based upon an energy of a difference between two consecutive pilot symbols and an energy of the pilot symbol, the bias being estimated over the at least one slot, and wherein the demapping element is configured to estimate the amplitude based upon the expectation of the power of the signal combination and the bias.

9. A system according to claim 8, wherein the demapping element is configured to estimate the expectation over one of at least one of the at least one slot and fractions of the at least one slot based upon a number of symbols in the estimate and a number of active Walsh channels in the QAM signal.

10. A system according to claim 9, wherein the demapping element is configured to estimate the expectation by:
determining the power of a signal combination of a traffic symbol and a pilot symbol for each symbol in the estimate for each active Walsh channel;
summing the powers for the symbols for each active Walsh channel into a total power for each active Walsh channel, and thereafter summing the total powers for the active Walsh channels into an aggregate power; and
averaging the aggregate power over the active Walsh channels,
and wherein the demapping element is configured to determine the power, summing the powers, summing the total powers and averaging the aggregate power over one of at least one of the at least one slot and fractions of the at least one slot.

11. A system according to claim 7, wherein the demapping element is configured to estimate the amplitude based upon a power of a signal combination of a traffic symbol and a pilot symbol.

12. A system according to claim 7 further comprising:
a master controller in electrical communication with the demapping element, wherein the master controller is configured to demodulate the traffic of the user in the supplemental channel of the QAM signal based upon the estimate of the amplitude.

13. A computer program product comprising a computer-readable storage medium having computer-readable program code portions stored therein, the computer-readable program portions comprising:
a first executable portion configured to receive, from a receiver, a Quadrature Amplitude Modulated (QAM) signal, wherein the signal comprises a pilot channel and a supplemental channel that includes traffic of a user and at least one other user, and wherein the first executable portion is configured to receive the signal over at least one slot; and
a second executable portion configured to estimate an amplitude of a signal constellation of the QAM signal over one of at least one of the at least one slot and fractions of the at least one slot based upon a speed of the receiver.

14. A computer program product according to claim 13, wherein the second executable portion estimates the amplitude by:
estimating an expectation of a power of a signal combination of a traffic symbol and a pilot symbol, wherein the expectation is estimated over one of at least one of the at least one slot and fractions of the at least one slot;
estimating a bias based upon an energy of a difference between two consecutive pilot symbols and an energy of the current pilot symbol, wherein the bias is estimated over the at least one slot; and
estimating the amplitude based upon the expectation of the power of the signal combination and the bias.

15. A computer program product according to claim 14, wherein the second executable portion estimates the expectation over one of at least one of the at least one slot and fractions of the at least one slot based upon a number of symbols in the estimate and a number of active Walsh channels in the QAM signal.

16. A computer program product according to claim 15, wherein the second executable portion estimates the expectation by:
determining the power of a signal combination of a traffic symbol and a pilot symbol for each symbol in the estimate for each active Walsh channel;
summing the powers for the symbols for each active Walsh channel into a total power for each active Walsh channel;
summing the total powers for the active Walsh channels into an aggregate power; and
averaging the aggregate power over the active Walsh channels,
and wherein the second executable portion determines the power, sums the powers, sums the total powers and averages the aggregate power over one of at least one of the at least one slot and fractions of the at least one slot.

17. A computer program product according to claim 13, wherein the second executable portion estimates the amplitude based upon a power of a signal combination of a traffic symbol and a pilot symbol.

18. A computer program product according to claim 13 further comprising:
a third executable portion for demodulating the traffic of the user in the supplemental channel of the QAM signal based upon the estimate of the amplitude.

* * * * *

UNITED STATES PATENT AND TRADEMARK OFFICE
CERTIFICATE OF CORRECTION

| | |
|---|---|
| PATENT NO. | : 7,359,445 B2 |
| APPLICATION NO. | : 10/608345 |
| DATED | : April 15, 2008 |
| INVENTOR(S) | : Kenney et al. |

It is certified that error appears in the above-identified patent and that said Letters Patent is hereby corrected as shown below:

Column 5,
Line 42, "(AID)" should read --(A/D)--.

Column 8,
Line 2, "repre" should read --represents the number--.

Column 17,
Line 3, "summming" should read --summing--.

Signed and Sealed this

Nineteenth Day of August, 2008

JON W. DUDAS
*Director of the United States Patent and Trademark Office*